United States Patent [19]

Matsufuji

[11] 4,222,887
[45] Sep. 16, 1980

[54] LIQUID CRYSTAL COMPOSITION
[75] Inventor: Yohji Matsufuji, Tokyo, Japan
[73] Assignee: Canon Kabushiki Kaisha, Tokyo, Japan
[21] Appl. No.: 923,732
[22] Filed: Jul. 11, 1978
[30] Foreign Application Priority Data Jul. 19, 1977 [JP] Japan .................. 52-87008

[51] Int. Cl.² .......................... C09K 3/34; G02F 1/13
[52] U.S. Cl. .................................. 252/299; 252/408; 350/350 R
[58] Field of Search ................ 252/299, 408; 350/350

[56] References Cited

U.S. PATENT DOCUMENTS

| | | | |
|---|---|---|---|
| 3,925,238 | 12/1975 | Gavrilovic | 252/299 |
| 4,011,173 | 3/1977 | Steinstrasser | 252/299 |
| 4,017,416 | 4/1977 | Inukai et al. | 252/299 |
| 4,020,002 | 4/1977 | Oh | 252/299 |
| 4,029,595 | 6/1977 | Ross et al. | 252/299 |
| 4,035,056 | 7/1977 | Coates et al. | 252/299 |
| 4,053,431 | 10/1977 | Scherrer et al. | 252/299 |
| 4,058,477 | 11/1977 | Boller et al. | 252/299 |
| 4,058,478 | 11/1977 | Boller et al. | 252/299 |
| 4,065,489 | 12/1977 | Steinstrasser | 252/299 |
| 4,083,797 | 4/1978 | Oh | 252/299 |

FOREIGN PATENT DOCUMENTS 2502904 7/1975 Fed. Rep. of Germany .......... 252/299

OTHER PUBLICATIONS

Karamysheva, L. A., et al., Mol. Cryst. Liq. Cryst., vol. 37, pp. 29–34 (1976).

Primary Examiner—Teddy S. Gron
Attorney, Agent, or Firm—Fitzpatrick, Cella, Harper & Scinto

[57] ABSTRACT

A liquid crystal composition comprising a mixture of at least one kind of liquid crystal substance represented by the following general formula (1) and at least one kind of compound selected from the groups consisting of the compounds represented by the following general formulas (2) to (8):

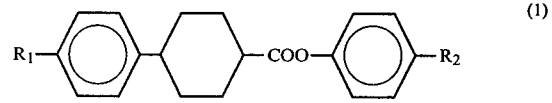

(1)

wherein $R_1$ and $R_2$ are CN group or selected from $C_nH_{2n+1}$, $C_nH_{2n+1}O$ and $C_nH_{2n+1}COO$ groups where n is an integer of from 1 to 10, and both $R_1$ and $R_2$ are not CN group simultaneously;

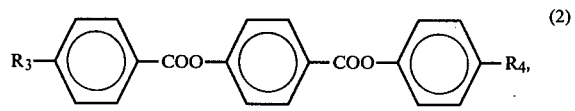

(2)

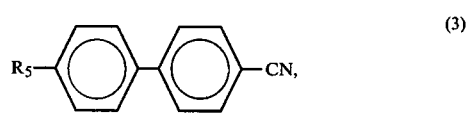

(3)

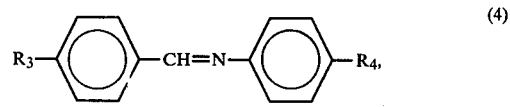

(4)

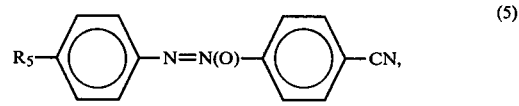

(5)

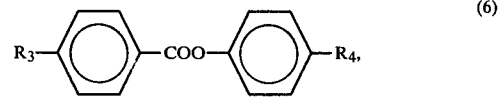

(6)

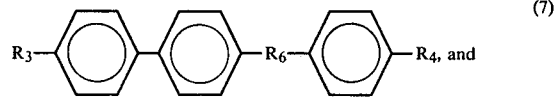

(7)

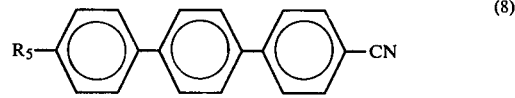

(8)

wherein $R_3$ and $R_4$ are CN group, or selected from $C_nH_{2n+1}$, $C_nH_{2n+1}O$, $C_nH_{2n+1}COO$ and $C_nH_{2n+1}OCOO$ groups where n is an integer of from 1 to 10, and both $R_3$ and $R_4$ are not CN group simultaneously; $R_5$ is selected from the above-described groups, except for CN group; and $R_6$ is selected from —COO—, —$C_2H_4$—, —O—$CH_2$— and —$C_2H_2$—.

25 Claims, 4 Drawings Figures

LIQUID CRYSTAL COMPOSITION

BACKGROUND OF THE INVENTION

1. Field of the Invention

This invention relates to a liquid crystal composition having a broad mesomorphic range. More particularly, it is concerned with a novel nematic liquid crystal composition for use in display devices, in which the electrical and temperature characteristics thereof are improved.

2. Description of the Prior Arts

In recent years, a number of researches and studies have been made on applications of liquid crystals, wherein the nematic type liquid crystal has been found to be applicable to various kinds of display devices. Such nematic liquid crystal can be classified, depending on its dielectric properties, into an Nn type liquid crystal and an Np type liquid crystal. The Nn type liquid crystal designates a substance having a negative dielectric anisotropy, i.e. the substance having a direction of its electrical dipole moment substantially perpendicular to the molecular long axis, while the Np type liquid crystal designates a substance having a positive dielectric anisotropy, i.e. the substance having a direction of its electrical dipole moment substantially parallel to the molecular long axis.

Since its application to a panel type display device utilizing its dynamic scattering mode (DSM) by Heilmeir of R.C.A. in 1968, the Nn type liquid crystal has attained remarkable progress in its researches and studies, and is now practically used in various fields such as horological instruments, electronic desk calculators, and so forth.

On the other hand, the Np type liquid crystal has first drawn attention of experts in this field by M. Schadt and W. Helfrich of Hoffmann-La Roche in 1971 through their thesis on "Twisted Nematic (T.N.) System" published in "Applied Physics Letters 18, (4), 127, 1971". The method for producing a liquid crystal cell of T.N. system is described in detail in the abovementioned literature as well as laid-open Japanese Patent Application No. 47-11737. Outlining this method, a liquid crystal substance is held between two electrodes, at least one of which is transparent, through a spacer, the electrode surface being so treated as to impart orientation to the liquid crystal, and a liquid crystal cell which has been so oriented that the molecular axis of the liquid crystal oriented on the mutually opposed electrode surfaces may become mutually perpendicular is disposed between two polarization plates. In this cell, when no electric field exists across the electrodes, the liquid crystal molecules are in such a construction that the molecular axis thereof is parallel to the electrode surface and forms a spiral as rotated by 90 degrees from one surface to the other. A linearly polarized light incident on this cell is emitted from the cell by the polarized plane thereof being rotated by 90 degrees so that when the cell is placed between the cross nicols, the sight can be seen bright, and when it is placed between the parallel nicols, the sight is seen dark. When an appropriate voltage is applied to this cell, the long axis of the liquid crystal molecules is oriented substantially perpendicularly with respect to the electrode surfaces with the consequence that the sight is seen dark in the case of the cell being placed between the cross nicols, and it is seen bright, when the cell is placed between the parallel nicols. In this manner, by utilizing contrast between the bright sight and the dark sight, desired display can be performed.

Since such T.N. cell possesses various advantageous aspects in comparison with the DSM cell such that it has a quick response, can operate at a low voltage, is low in its power consumption, and so forth, its practical utility as the alpha-numeric display devices such as horological instruments, electronic desk calculators, and various measuring instruments is remarkably expanding in recent years.

The liquid crystal substance to be used for such display device is required to have various characteristics. For instance, the liquid crystal substance should have a wide temperature range between a transition temperature $T_N$ of the crystal (or smectic) phase$\rightleftarrows$nematic phase and a transition temperature $T_I$ of nematic phase$\rightleftarrows$isotropic liquic phase, i.e. a temperature range exhibiting the nematic phase, or mesomorphic range (hereinafter abbreviated as "M.R.") which is in the operating temperature range of, for example, between 0° C. and 50° C. Also, stability of the display device to the environmental conditions such as temperature change, light, humidity, etc., or stability to electrochemical reactions due to voltage applied to operate the device constitutes the important conditions for the liquid crystal substance. In the field of photographic cameras or automotive vehicles, since the operating temperature of the device could range between $-30°$ and $80°$ C. or higher, or, in some occasion, higher than 100° C., it is desirable that the liquid crystal be not thermally decomposed, and the molecular orientation of the liquid crystal which is characteristic of the T.N. system be not disturbed, even under such conditions. Furthermore, good response property to the voltage applications is required for such liquid crystal. In general, the response property of the liquid crystal to the voltage application depends on viscosity or dielectric anisotropy of the liquid crystal substance. However, since the liquid crystal substance is generally highly viscous, its responsiveness at time of voltage application or its elimination, in particular, at the time of decaying due to the voltage elimination, is not so satisfactory. Accordingly, a liquid crystal substance of as low viscosity and as large dielectric anisotropy as possible is desired.

Figures 1, 2:
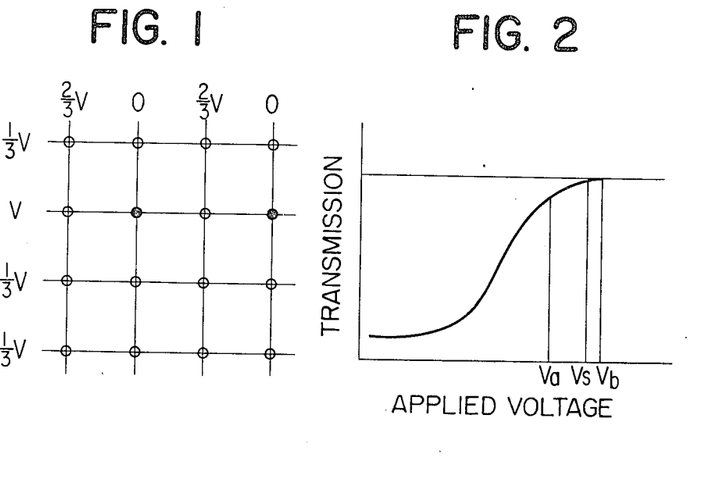
FIG. 1 is an explanatory diagram when the matrix drive is effected using a liquid crystal display cell.
FIG. 2 is a graphical representation showing a relationship between an applied voltage and a transmitted light intensity or transmission when a voltage is applied to the liquid crystal display cell.

Or, in driving the display device, a large "voltage margin" to be described later is also the requisite condition for the liquid crystal substance. In other words, when the alpha-numeric display is to be effected, there are two ways of "static drive" and "dynamic drive" from the standpoint of the lead wire connection. In case many numbers of letters or characters are to be displayed, the dynamic drive system is more advantageous. This dynamic drive is exactly the same in theory as the matrix drive as shown in FIG. 1 of the accompanying drawing. In general, the liquid crystal cell is applied with a voltage in such a manner as shown in FIG. 1 to prevent cross-talk from taking place. In the drawing, the vertical lines and the horizontal lines representing the electrodes are mutually intersected, although, in the actual cell, both lines are spatially separated, and the liquid crystal substance is filled therebetween. The solid black dots in the drawing denote the selection points, to which a voltage V is applied, while the white dots denote the semi-selection or non-selection points, to which a voltage 1/3V is applied. The voltage V is so determined that light may be intercepted at this solid black dot portions, and it may be transmitted through the white dot portions.

Figure 3A:
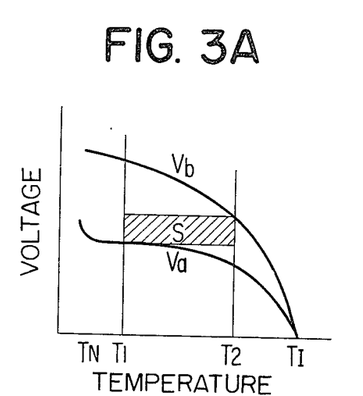
FIG. 3A is a graphical representation showing a relationship between temperature and voltage margin within the mesomorphic range (M.R.)
Figure 3B:
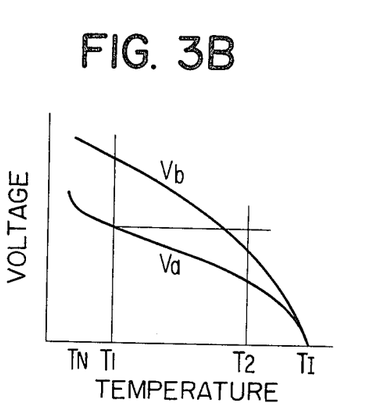
FIG. 3B is also a graphical representation showing a typical example of the characteristics of ordinary nematic liquid crystal.

FIG. 2 indicates a relationship between voltage and intensity of transmitted light, or transmission. If a voltage V can be used which is sufficiently larger than a voltage value $V_s$ at the time when the transmitted light intensity becomes saturated, the contrast, etc. do not matter so much. However, since undesirable cross-talk arises as mentioned in the foregoing, there exists an upper limit voltage $V_b$ from this point. Also, since a definite transmitted light intensity should be obtained, there is necessity for a lower limit voltage $V_a$. In other words, when the liquid crystal cell is subjected to the matrix drive, it is so designed that the source voltage may satisfy a relationship of $V_a \leq V$ "$V_b$. However, in case the value of the "voltage margin" ($V_{b-}V_a$) is small (in most of the heretofore known liquid crystal substance, the value was 0.1 to 0.2V or so), a circuit that is able to confine this driving voltage constantly within this range becomes necessary with the consequence that the circuit becomes highly complicated or expensive in manufacturing costs. In addition, since the voltage margin is largely affected by a temperature change, a usable temperature range is limited, or there is also required a circuit in which a drive voltage is varied in correspondence to the temperature change. Such situation is shown in FIGS. 3A and 3B, FIG. 3A indicating a relationship between the temperature and the voltage margin within the mesomorphic range (M.R.), and FIG. 3B showing typical example of an ordinary nematic liquid crystal. In FIG. 3A, the liquid crystal composition is considered excellent as the diagonally hatched portion S in the graphical representation becomes larger, when the driving temperature range of the liquid crystal cell is set between $T_1$ and $T_2$. If the lower limit voltage $V_a$ at $T_1$ is greater than the upper limit voltage $V_b$ at $T_2$ as shown in FIG. 3B, there is no portion at all corresponding to the above-mentioned hatched portion S in FIG. 3A. On the other hand, if preference is given to the driving temperature range $T_1 - T_2$, the circuit should be so designed that voltage may be varied by the temperature. Further, when the voltage is made constant, the operating temperature range of the device utilizing the cell should be restricted with the consequence that circulation area of the article is limited.

In order to meet the afore-described demands, there have so far been studied various kinds of liquid crystal substances.

U.S. Pat. No. 3,952,046 discloses a liquid crystal substance represented by the following general formula:

(where R represents alkyl having a carbon content of from 3 to 8, or alcoxy group having a carbon content of from 3 to 10).

U.S. Pat. No. 3,954,653 discloses an Np type liquid crystal composition consisting of compounds represented by the following general formulas:

(where R is selected from $C_nH_{2n+1}O$, $C_nH_{2n+1}COO$ and $C_nH_{2n+1}OCOO$ groups in straight chain form, n being an integer of from 1 to 10).

U.S. Pat. No. 4,011,173 teaches an Np type liquid crystal composition consisting of a mixture of the following compounds:

(where $R_1$ and $R_2$ are alkyl or alkoxy group having a carbon content of from 1 to 8); and

X—R—Y (where X is dialkylamino having a carbon content of from 2 to 4; Y is Cn, $NO_2$ or $CF_3$; and R is The patent also discloses that the following compound also be mixed depending on necessity:

(where $R_1$ and $R_2$ are alkyl or alcoxy group having a carbon content of from 1 to 8).

U.S. Pat. No. 4,020,002 discloses a liquid crystal composition prepared by mixing the following compound as the Nn type liquid crystal:

with the following compound as the Np type liquid crystal at a ratio of from 2 to 50 wt %.

Further, U.S. Pat. No. 3,891,307 discloses an electro-optical device, in which a liquid crystal substance is held between the opposed electrodes. For the liquid crystal substance, there is described a composition consisting of 30 to 99% by weight of Np type nematic liquid crystal and 70 to 1% by weight of an optically active steroid compound. Further, in this patent specification, the Np type liquid crystal is generally exemplified as Schiff base having CN group, phenyl benzoic acid ester, azo-type compounds, and so on, while the Nn type liquid crystal is generally exemplified as azo-type and azoxy-type compounds which have alkyl and alkoxy, and Schiff base.

In most of the heretofore known liquid crystal compositions, it was considerably difficult to satisfy the aforedescribed various conditions. For instance, there have been obtained thermally stable compositions among these known liquid crystal compositions although their transition temperature $T_N$ at the low temperature side increases as the temperature $T_I$ increases, hence few liquid crystal compounds could cover the whole practical temperature range. Furthermore, those liquid crystal compositions which can satisfy the above-mentioned conditions and possesses satisfactory response to the voltage application or removal are also few. In addition, very few liquid crystal composition could show stable electrical characteristics against temperature change, e.g. small fluctuations in the voltage margin.

SUMMARY OF THE INVENTION

In view of the above-mentioned various points of problems, it is an object of the present invention to provide a liquid crystal composition that can be adequately utilized in the liquid crystal display devices.

It is another object of the present invention to provide a liquid crystal composition which has a broad nematic mesomorphic range (M.R.) and a satisfactory response to voltage.

It is still another object of the present invention to provide a liquid crystal composition which has stable electrical characteristics against temperature changes, in particular, which has small fluctuations in the voltage margin.

It is further object of the present invention to provide a liquid crystal composition which is stable under conditions for use of the display device.

It is still further object of the present invention to provide a liquid crystal composition for a display device capable of performing the dynamic drive.

According to the present invention, generally speaking, there is provided a liquid crystal composition comprising a mixture of at least one kind of phenyl cyclohexane carboxylic phenyl ester compounds represented by the following general formula (1) and at least one kind of compound selected from the groups consisting of the compounds represented by the following general formulas (2) to (8):

wherein $R_1$ and $R_2$ are CN group or selected from $C_nH_{2n+1}$, $C_nH_{2n+1}O$ and $C_nH_{2n+1}COO$ groups where n is an integer of from 1 to 10, and both $R_1$ and $R_2$ are not CN group simultaneously;

wherein $R_3$ and $R_4$ are CN group, or selected from $C_nH_{2n+1}$, $C_nH_{2n+1}O$, $C_nH_{2n+1}COO$ and $C_nH_{2n+1}OCOO$ groups where n is an integer of from 1 to 10, and both $R_3$ and $R_4$ are not CN group simultaneously; $R_5$ is selected from the above-described groups, except for CN group; and $R_6$ is selected from —COO—, —$C_2H_4$—, —O—$CH_2$— and —$C_2H_2$—.

DESCRIPTION OF THE PREFERRED EMBODIMENTS

The essential component of the liquid crystal composition according to the present invention is at least one kind of liquid crystal substance represented by the following general formula (1).

(1)

This liquid crystal substance is a phenyl ester compound of 4(4-substituted phenyl) cyclohexane carboxylic acid which is synthesized with biphenyl as the starting material. The method of synthesis is described in the thesis by L. A. Karamysheva at al. (Molecular Crystals and Liquid Crystals, 37, 29 (1976)).

In the present invention, $R_1$ and $R_2$ in the above-described general formula (1) are selected from CN group, or $C_nH_{2n+1}-$, $C_nH_{2n+1}O-$ and $C_nH_{2n+1}COO$ groups where n is an integer of from 1 to 10, and both $R_1$ and $R_2$ are not the CN group simultaneously. For the $C_nH_{2n+1}-$, $C_nH_{2n+1}O-$ and $C_nH_{2n+1}COO$ groups, those in the straight chains form with n being in the range of from 1 to 8 are preferable. Also, for the above-mentioned combination of various groups, there may be contemplated cases, wherein either $R_1$ or $R_2$ is the CN group and the other is $C_nH_{2n+1}$, $C_nH_{2n+1}O$, or $C_nH_{2n+1}COO$ group, and $R_1$ and $R_2$ are selected from $C_nH_{2n+1}$, $C_nH_{2n+1}O$ and $C_nH_{2n+1}COO$ groups in the straight chain form with n being from 1 to 8, both cases being considered preferable. In particular, in the latter case, it is preferable that the sum of n in the substituent groups $R_1$ and $R_2$ be 2 to 16, or more preferably from 5 to 12.

The component to be mixed with the above-mentioned liquid crystal substance is at least one kind of liquid crystal substances represented by the following general formulas (2) to (8).

(2)

(3)

(4)

(5)

(6)

(7)

(8)

wherein $R_3$ and $R_4$ in the general formulas (2), (4), (6) and (7) are CN group, or selected from $C_nH_{2n+1}$, $C_nH_{2n+1}O$, $C_nH_{2n+1}COO$ and $C_nH_{2n+1}OCOO$ groups in the straight chain form when n is an integer of from 1 to 10, or more preferably from 2 to 8, and both $R_3$ and $R_4$ are not the CN group simultaneously; $R_5$ in the formulas (3), (5) and (8) is selected from the above-mentioned groups, except for CN group; $R_6$ in the general formula (7) is selected from $-COO-$, $-C_2H_4-$, $-O-CH_2-$ and $-C_2H_2-$, or preferably from $-COO-$, $-C_2H_4-$ and $-O-CH_2-$, or more preferably $-COO-$; and the sum of the integer n in the combination of $R_3$ and $R_4$ in the compounds represented by these general formulas (2) to (8) may preferably be in the range of from 2 to 16, or more preferably from 4 to 12.

In the foregoing, outlines have been explained as to the liquid crystal substances represented by the general formulas (1) to (8). The following Tables 1 to 8 indicate actual examples of the liquid crystal substances to be used in the present invention.

TABLE 1

LIQUID CRYSTAL SUBSTANCE REPRESENTED BY GENERAL FORMULA (1)

| Compound | $R_1$ | $R_2$ | Compound | $R_1$ | $R_2$ |
|---|---|---|---|---|---|
| $A_1$ | $C_4H_9$ | CN | $B_1$ | $C_4H_9O$ | CN |
| $A_2$ | $C_5H_{11}$ | CN | $B_2$ | $C_5H_{11}O$ | CN |
| $A_3$ | $C_6H_{13}$ | CN | $B_3$ | $C_6H_{13}O$ | CN |
| $A_4$ | $C_7H_{15}$ | CN | $B_4$ | $C_7H_{15}O$ | CN |
| $A_5$ | $C_8H_{17}$ | CN | $B_5$ | $C_8H_{17}O$ | CN |
| $A_6$ | $C_9H_{19}$ | CN | $B_6$ | $C_9H_{19}O$ | CN |
| $A_7$ | CN | $C_4H_9$ | $B_7$ | CN | $C_4H_9O$ |
| $A_8$ | CN | $C_5H_{11}$ | $B_8$ | CN | $C_5H_{11}O$ |
| $A_9$ | CN | $C_6H_{13}$ | $B_9$ | CN | $C_6H_{13}O$ |
| $A_{10}$ | CN | $C_7H_{15}$ | $B_{10}$ | CN | $C_7H_{15}O$ |
| $A_{11}$ | CN | $C_8H_{17}$ | $B_{11}$ | CN | $C_8H_{17}O$ |
| $C_1$ | $C_5H_{11}COO$ | CN | $E_1$ | $CH_3O$ | $C_5H_{11}$ |
| $C_2$ | $C_6H_{13}COO$ | CN | $E_2$ | $C_2H_5O$ | $C_8H_{17}$ |
| $C_3$ | $C_7H_{15}COO$ | CN | $E_3$ | $C_5H_{11}O$ | $C_4H_9$ |
| $C_4$ | $C_8H_{17}COO$ | CN | $E_4$ | $C_6H_{13}O$ | $CH_3$ |

TABLE 1-continued
LIQUID CRYSTAL SUBSTANCE REPRESENTED BY GENERAL FORMULA (1)

$$R_1-\bigcirc-\bigcirc-COO-\bigcirc-R_2$$

| Compound | $R_1$ | $R_2$ | Compound | $R_1$ | $R_2$ |
|---|---|---|---|---|---|
| $C_5$ | CN | $C_5H_{11}COO$ | $E_5$ | $CH_3O$ | $C_2H_5O$ |
| $C_6$ | CN | $C_6H_{13}COO$ | $E_6$ | $C_3H_7O$ | $C_6H_{13}O$ |
| $C_7$ | CN | $C_7H_{15}COO$ | $E_7$ | $C_4H_9O$ | $C_5H_{11}O$ |
| $D_1$ | $C_2H_5$ | $C_4H_9$ | $E_8$ | $C_7H_{15}O$ | $C_3H_7O$ |
| $D_2$ | $C_2H_5$ | $C_8H_{17}$ | $E_9$ | $C_7H_{15}O$ | $C_6H_{13}O$ |
| $D_3$ | $C_6H_{13}$ | $C_3H_7$ | $F_1$ | $CH_3$ | $C_4H_9COO$ |
| $D_4$ | $C_7H_{15}$ | $C_7H_{15}$ | $F_2$ | $C_5H_{11}$ | $C_6H_{13}COO$ |
| $D_5$ | $CH_3$ | $C_4H_9O$ | $F_3$ | $C_3H_7O$ | $C_4H_9COO$ |
| $D_6$ | $C_2H_5$ | $C_7H_{15}O$ | $F_4$ | $CH_3COO$ | $C_5H_{11}$ |
| $D_7$ | $C_5H_{11}$ | $C_6H_{13}O$ | $F_5$ | $C_3H_7COO$ | $C_3H_7O$ |
| $D_8$ | $C_7H_{15}$ | $C_8H_{17}O$ | $F_6$ | $C_5H_{11}COO$ | $C_2H_5$ |

TABLE 2
LIQUID CRYSTAL SUBSTANCE REPRESENTED BY GENERAL FORMULA (2)

$$R_3-\bigcirc-COO-\bigcirc-COO-\bigcirc-R_4$$

| Compound | $R_3$ | $R_4$ | Compound | $R_3$ | $R_4$ |
|---|---|---|---|---|---|
| $G_1$ | $C_2H_5$ | $C_2H_5$ | $I_5$ | $CH_3O$ | $C_2H_5$ |
| $G_2$ | $C_3H_7$ | $C_5H_{11}$ | $I_6$ | $C_4H_9O$ | $C_6H_{13}$ |
| $G_3$ | $C_3H_7$ | $C_8H_{17}$ | $I_7$ | $C_6H_{13}O$ | $C_8H_{17}$ |
| $G_4$ | $C_4H_9$ | $C_4H_9$ | $I_8$ | $C_8H_{17}O$ | $C_3H_7$ |
| $G_5$ | $C_6H_{13}$ | $C_8H_{17}$ | $I_9$ | $C_3H_7O$ | $C_5H_{11}$ |
| $G_6$ | $C_7H_{15}$ | $C_2H_5$ | $I_{10}$ | $C_6H_{13}O$ | $C_4H_9$ |
| $G_7$ | $C_9H_{19}$ | $C_5H_{11}$ | $J_1$ | $CH_3O$ | $C_3H_7O$ |
| $G_8$ | $CH_3$ | $C_4H_9$ | $J_2$ | $CH_3O$ | $C_6H_{13}O$ |
| $G_9$ | $C_5H_{11}$ | $C_7H_{15}$ | $J_3$ | $C_2H_5O$ | $C_4H_9O$ |
| $G_{10}$ | $C_8H_{17}$ | $C_2H_5$ | $J_4$ | $C_4H_9O$ | $C_4H_9O$ |
| $G_{11}$ | $C_2H_5$ | $C_4H_9$ | $J_5$ | $C_6H_{13}O$ | $CH_3O$ |
| $G_{12}$ | $C_5H_{11}$ | $C_5H_{11}$ | $J_6$ | $C_6H_{13}O$ | $C_5H_{11}O$ |
| $H_1$ | $C_4H_7$ | $CH_3$ | $J_7$ | $C_8H_{17}O$ | $C_4H_9O$ |
| $H_2$ | $C_3H_7$ | $C_2H_5$ | $K_1$ | $CH_3COO$ | $C_4H_9$ |
| $H_3$ | $C_5H_{11}$ | $C_8H_{17}$ | $K_2$ | $CH_3COO$ | $C_4H_9O$ |
| $H_4$ | $C_5H_{11}$ | $C_3H_7$ | $K_3$ | $C_4H_9COO$ | $CH_3$ |
| $H_5$ | $C_6H_{13}$ | $C_6H_{13}$ | $K_4$ | $C_4H_9COO$ | $C_4H_9$ |
| $H_6$ | $C_7H_{15}$ | $C_4H_9$ | $K_5$ | $C_6H_{13}COO$ | $C_2H_5$ |
| $H_7$ | $C_6H_{13}$ | $C_2H_5$ | $K_6$ | $C_7H_{15}COO$ | $C_8H_{17}$ |
| $H_8$ | $C_4H_9$ | $C_6H_{13}$ | $K_7$ | $C_4H_9COO$ | $C_4H_9O$ |
| $H_9$ | $C_8H_{17}$ | $C_{10}H_{21}$ | $K_8$ | $C_2H_5COO$ | $C_6H_{13}O$ |
| $H_{10}$ | $CH_3$ | $C_7H_{15}$ | $K_9$ | $CH_3$ | $C_4H_9COO$ |
| $H_{11}$ | $C_7H_{15}$ | $C_9H_{19}$ | $K_{10}$ | $C_4H_9O$ | $C_5H_{11}COO$ |
| $H_{12}$ | $C_2H_5$ | $CH_3$ | $L_1$ | $C_3H_7$ | CN |
| $I_1$ | $CH_3O$ | $C_4H_9$ | $L_2$ | $C_5H_{11}$ | CN |
| $I_2$ | $CH_3O$ | $C_5H_{11}$ | $L_3$ | $C_4H_9O$ | CN |
| $I_3$ | $C_3H_7O$ | $C_5H_{11}$ | $L_4$ | $CH_3O$ | CN |
| $I_4$ | $C_4H_9O$ | $C_5H_{11}$ | $L_5$ | CN | $C_4H_9$ |

TABLE 3
LIQUID CRYSTAL SUBSTANCE REPRESENTED BY GENERAL FORMULA (3)

$$R_5-\bigcirc-\bigcirc-CN$$

| Compound | $R_5$ | Compound | $R_5$ | Compound | $R_5$ |
|---|---|---|---|---|---|
| $M_1$ | $C_4H_9$ | $N_1$ | $C_4H_9O$ | $O_1$ | $C_3H_7COO$ |
| $M_2$ | $C_5H_{11}$ | $N_2$ | $C_5H_{11}O$ | $O_2$ | $C_4H_9COO$ |
| $M_3$ | $C_6H_{13}$ | $N_3$ | $C_6H_{13}O$ | $O_3$ | $C_5H_{11}COO$ |
| $M_4$ | $C_7H_{15}$ | $N_4$ | $C_7H_{15}O$ | $O_4$ | $C_6H_{13}COO$ |
| $M_5$ | $C_8H_{17}$ | $N_5$ | $C_8H_{17}O$ | $O_5$ | $C_7H_{15}COO$ |
| $M_6$ | $C_9H_{19}$ | $N_6$ | $C_9H_{19}O$ | $O_6$ | $C_8H_{17}COO$ |

TABLE 4
LIQUID CRYSTAL SUBSTANCE REPRESENTED BY GENERAL FORMULA (4)

$$R_3-\bigcirc-CH=N-\bigcirc-R_4$$

| Compound | $R_3$ | $R_4$ | Compound | $R_3$ | $R_4$ |
|---|---|---|---|---|---|
| $P_1$ | $C_3H_7$ | CN | $P_{14}$ | $C_8H_{17}COO$ | CN |
| $P_2$ | $C_4H_9$ | CN | $P_{15}$ | $C_6H_{13}OCOO$ | CN |
| $P_3$ | $C_5H_{11}$ | CN | $P_{16}$ | $C_7H_{15}OCOO$ | CN |
| $P_4$ | $C_6H_{13}$ | CN | $Q_1$ | CN | $C_2H_5$ |
| $P_5$ | $C_7H_{15}$ | CN | $Q_2$ | CN | $C_3H_7$ |
| $P_6$ | $C_3H_7O$ | CN | $Q_3$ | CN | $C_7H_{15}$ |
| $P_7$ | $C_4H_9O$ | CN | $Q_4$ | CN | $C_5H_{11}O$ |
| $P_8$ | $C_5H_{11}O$ | CN | $Q_5$ | CN | $C_6H_{13}O$ |
| $P_9$ | $C_6H_{13}O$ | CN | $Q_6$ | CN | $C_7H_{15}O$ |
| $P_{10}$ | $C_7H_{15}O$ | CN | $Q_7$ | CN | $C_6H_{13}COO$ |
| $P_{11}$ | $C_5H_{11}COO$ | CN | $Q_8$ | CN | $C_8H_{17}COO$ |
| $P_{12}$ | $C_6H_{13}COO$ | CN | $Q_9$ | CN | $C_7H_{15}OCOO$ |
| $P_{13}$ | $C_7H_{15}COO$ | CN | $Q_{10}$ | CN | $C_8H_{17}OCOO$ |

TABLE 5
LIQUID CRYSTAL SUBSTANCE REPRESENTED BY GENERAL FORMULA (5)

$$R_5-\bigcirc-N=N(O)-\bigcirc-CN$$

| Compound | $R_5$ | Compound | $R_5$ |
|---|---|---|---|
| $r_1$ | $C_4H_9$ | $S_1$ | $C_5H_{11}COO$ |
| $r_2$ | $C_5H_{11}$ | $S_2$ | $C_6H_{13}COO$ |
| $r_3$ | $C_6H_{13}$ | $S_3$ | $C_7H_{15}COO$ |
| $r_4$ | $C_7H_{15}$ | $S_4$ | $C_8H_{17}COO$ |
| $r_5$ | $C_8H_{17}$ | $S_5$ | $C_4H_9OCOO$ |
| $r_6$ | $C_4H_9O$ | $S_6$ | $C_5H_{11}OCOO$ |
| $r_7$ | $C_5H_{11}O$ | $S_7$ | $C_6H_{13}OCOO$ |
| $r_8$ | $C_6H_{13}O$ | $S_8$ | $C_7H_{15}OCOO$ |
| $r_9$ | $C_7H_{15}O$ | $S_9$ | $C_8H_{17}OCOO$ |
| $r_{10}$ | $C_8H_{17}O$ | | |

TABLE 6
LIQUID CRYSTAL SUBSTANCE REPRESENTED BY GENERAL FORMULA (6)

| Compound | $R_3$ | $R_4$ | Compound | $R_3$ | $R_4$ |
|---|---|---|---|---|---|
| $T_1$ | $C_5H_{11}$ | CN | $U_1$ | CN | $C_6H_{12}$ |
| $T_2$ | $C_6H_{13}$ | CN | $U_2$ | CN | $C_7H_{15}$ |
| $T_3$ | $C_7H_{15}$ | CN | $U_3$ | CN | $C_8H_{17}$ |
| $T_4$ | $C_8H_{17}$ | CN | $U_4$ | CN | $C_9H_{19}$ |
| $T_5$ | $C_6H_{13}O$ | CN | $U_5$ | CN | $C_5H_{11}O$ |
| $T_6$ | $C_7H_{15}O$ | CN | $U_6$ | CN | $C_6H_{13}O$ |
| $T_7$ | $C_8H_{17}O$ | CN | $U_7$ | CN | $C_7H_{15}O$ |
| $T_8$ | $C_3H_7COO$ | CN | $U_8$ | CN | $C_8H_{17}O$ |
| $T_9$ | $C_5H_{11}COO$ | CN | $U_9$ | CN | $C_4H_9COO$ |
| $T_{10}$ | $C_6H_{13}COO$ | CN | $U_{10}$ | CN | $C_5H_{11}COO$ |
| $T_{11}$ | $C_4H_9OCOO$ | CN | $U_{11}$ | CN | $C_4H_9OCOO$ |
| $T_{12}$ | $C_6H_{13}OCOO$ | CN | $U_{12}$ | CN | $C_5H_{11}OCOO$ |
| $T_{13}$ | $C_7H_{15}OCOO$ | CN | $U_{13}$ | CN | $C_7H_{15}OCOO$ |

TABLE 7
LIQUID CRYSTAL SUBSTANCE REPRESENTED BY GENERAL FORMULA (7)

| Compound | $R_3$ | $R_4$ | $R_6$ |
|---|---|---|---|
| $V_1$ | $C_3H_7$ | CN | COO |
| $V_2$ | $C_4H_9$ | CN | COO |
| $V_3$ | $C_5H_{11}$ | CN | COO |
| $V_4$ | $C_6H_{13}$ | CN | COO |
| $V_5$ | $C_7H_{15}$ | CN | COO |
| $V_6$ | $C_8H_{17}$ | CN | COO |
| $V_7$ | CN | $C_4H_9$ | COO |
| $V_8$ | CN | $C_5H_{11}$ | COO |
| $V_9$ | CN | $C_6H_{13}$ | COO |
| $V_{10}$ | CN | $C_7H_{15}$ | COO |
| $W_1$ | $C_2H_5O$ | CN | COO |
| $W_2$ | $C_4H_9O$ | CN | COO |
| $W_3$ | $C_5H_{11}O$ | CN | COO |
| $W_4$ | $C_8H_{17}O$ | CN | COO |
| $W_5$ | CN | $CH_3O$ | COO |
| $W_6$ | CN | $C_3H_7O$ | COO |
| $W_7$ | CN | $C_4H_9O$ | COO |
| $W_8$ | CN | $C_6H_{13}O$ | COO |
| $W_9$ | $C_4H_9COO$ | CN | COO |
| $W_{10}$ | $C_6H_{13}COO$ | CN | COO |
| $W_{11}$ | $C_8H_{17}COO$ | CN | COO |
| $W_{12}$ | CN | $C_4H_9COO$ | COO |
| $W_{13}$ | CN | $C_7H_{15}COO$ | COO |
| $X_1$ | $C_4H_9$ | CN | $C_2H_4$ |
| $X_2$ | $C_5H_{11}$ | CN | $C_2H_4$ |
| $X_3$ | $C_7H_{15}$ | CN | $C_2H_4$ |
| $X_4$ | CN | $C_3H_7$ | $C_2H_4$ |
| $X_5$ | CN | $C_5H_{11}$ | $C_2H_4$ |
| $X_6$ | CN | $C_6H_{13}$ | $C_2H_4$ |
| $X_7$ | CN | $C_8H_{17}$ | $C_2H_4$ |
| $X_8$ | $CH_3O$ | CN | $C_2H_4$ |
| $X_9$ | $C_3H_7O$ | CN | $C_2H_4$ |
| $X_{10}$ | $C_4H_9O$ | CN | $C_2H_4$ |
| $X_{11}$ | $C_7H_{15}O$ | CN | $C_2H_4$ |
| $X_{12}$ | CN | $C_2H_5O$ | $C_2H_4$ |
| $X_{13}$ | CN | $C_5H_{11}O$ | $C_2H_4$ |
| $X_{14}$ | CN | $C_6H_{13}O$ | $C_2H_4$ |
| $X_{15}$ | CN | $C_8H_{17}O$ | $C_2H_4$ |
| $X_{16}$ | $C_4H_9COO$ | CN | $C_2H_4$ |
| $Y_1$ | $CH_3$ | CN | $OCH_2$ |
| $Y_2$ | $C_4H_9$ | CN | $OCH_2$ |
| $Y_3$ | $C_7H_{15}$ | CN | $OCH_2$ |
| $Y_4$ | CN | $C_2H_5$ | $OCH_2$ |
| $Y_5$ | CN | $C_5H_{11}$ | $OCH_2$ |
| $Y_6$ | CN | $C_6H_{13}$ | $OCH_2$ |
| $Y_7$ | $C_3H_7O$ | CN | $OCH_2$ |
| $Y_8$ | $C_5H_{11}O$ | CN | $OCH_2$ |
| $Y_9$ | $C_8H_{17}O$ | CN | $OCH_2$ |

TABLE 8
LIQUID CRYSTAL SUBSTANCE REPRESENTED BY GENERAL FORMULA (8)

| Compound | $R_5$ | Compound | $R_5$ |
|---|---|---|---|
| $Z_1$ | $C_4H_9$ | $Z_6$ | $C_4H_9O$ |
| $Z_2$ | $C_5H_{11}$ | $Z_7$ | $C_5H_{11}O$ |
| $Z_3$ | $C_6H_{13}$ | $Z_8$ | $C_6H_{13}O$ |
| $Z_4$ | $C_7H_{15}$ | $Z_9$ | $C_7H_{15}O$ |
| $Z_5$ | $C_8H_{17}$ | $Z_{10}$ | $C_8H_{17}O$ |

This liquid crystal composition according to the present invention should preferably be prepared by mixing the constituent members in the following manner depending on their selection.

In case, for example, the liquid crystal of the general formula (1) is rendered the Nn type, $R_1$ and $R_2$ are selected from $C_nH_{2n+1}$, $C_nH_{2n+1}O$ and $C_nH_{2n+1}COO$ groups with n being from 1 to 10. In this case, the liquid crystal substance of the general formulas (2) to (8) to be mixed with the liquid crystal substance of the general formula (1) should, without exception, be of the Np type whose substituent group (at least one of $R_3$ and $R_4$) is CN. On the other hand, when the liquid crystal substance of the general formula (1) is rendered the Np type, any one of $R_1$ and $R_2$ is the CN group. In this case, the liquid crystal of the general formulas (2) to (8) may be either the Np type or the Nn type, although it is desirable to choose the Np type, any one of the substituent groups of which is the CN group, in view of various characteristics. Also, when the liquid crystal composition is prepared from the mixtures of two or more kinds of the liquid crystal substances belonging to the same general formula (1) and two or more kinds of those covered by the same general formulas (2) to (8), the individual liquid crystal substance may be either the Np type or the Nn type, although each resultant mixture should preferably be of the Np type. In such a case, if and when the Np type liquid crystal substance having CN group is contained in the composition, the final liquid crystal composition is of the Np type. However, from the standpoint of various properties, it is further preferable that the mixture of the liquid crystal substances to be represented by the general formulas (1) through (8) inclusive be of the Np type.

While the mixing ratio of these liquiid crystal substances depends on the individual liquid crystal substance to be mixed, it may be from 1 to 99% by weight, or preferably from 5 to 90% by weight or more preferably from 10 to 70% by weight, based on the final liquid crystal composition. In particular, when the liquid crystal substance of the general formula (3) or (6) is incorporated it is desirable that the ratio of the liquid crystal substance represented by the general formula (1) ranges from 1 to 90% by weight, or preferably from 5 to 70% by weight, or more preferably from 10 to 50% by weight.

Moreover, in the liquid crystal composition according to the present invention, a mixture of the liquid crystal substances consisting of those represented by the general formulas (1) and (2); (1) and (3), or (1), (2) and (3), of which the mixture consisting of the liquid crystal substances represented by the general formulas (1), (2) and (3) is particularly preferable.

The liquid crystal composition of the present invention obtained in the above-described manner has a positive dielectric anisotropy, has the mesomorphic range (M.R.) thereof which is sufficiently broad ranging from a low temperature side to a high temperature side inclusive of a room temperature, and has good response to voltage within the temperature range thereof. Also, the liquid crystal composition has excellent electrical characteristic within the M.R. such as, in particular, the least fluctuation in the voltage margin. It is also chemically stable, and possesses various excellent properties such as heat resistance, acid resistance, alkali resistance, light resistance, weather resistance, and stability to electrochemical reaction. Thus, the liquid crystal composition according to the present invention satisfies all the requisite performances required of the liquid crystal substance when it is practically used for the display device.

It is further possible that various additives may be added to the liquid crystal composition of the present invention. For example, inclusion of a substance having the positive dielectric anisotropy such as or within a range not exceeding 10% meets the purpose of the present invention. Also, inclusion of cholesteric liquid crystal such as halogenated cholesterols like cholesteric chloride, cholesteric bromide, etc., cholesteric esters like cholesteric oleate, cholesteric acetate, etc. in the liquid crystal composition within a range of 5%, or preferably within 2%, or more preferably not exceeding 1% meets the purpose of the present invention. Furthermore, the liquid crystal composition according to the present invention may contain therein chiral nematic liquid crystal such as 4'-(2-methylbutyl)-4-cyanobiphenyl, 4'-(3-methylhexyl)-4-cyanobiphenyl, 4''-(2-methylbutyl)-4-cyanoterphenyl, 4''-cyanophenyl-4-(2-methylbutyl)-cyclohexylbenzoate, etc. at a ratio within 5%, or preferably within 2%, or more preferably not exceeding 1%, thereby meeting the purpose of the present invention.

Considering its practical application, the liquid crystal composition according to the present invention should desirably have the mesomorphic range (M.R.) which is higher by 20° C. than the upper limit of the operating temperature range $T_1$-$T_2$ of the liquid crystal cell, or preferably by 30° C., or more preferably by 40° C., and is lower by 10° C. than the lower limit of the temperature range, or preferably by 15° C., or more preferably by 20° C. As an example, when the liquid crystal composition according to the present invention is used for the electronic desk calculators, the liquid crystal composition having the mesomorphic range (M.R.) of from −10° C. to 60° C., or preferably from −15° C. to 70° C., or more preferably from −20° C. to 80° C. and above is desirable. Also, when it is used for photographic cameras, the liquid crystal composition should desirably have the mesomorphic range (M.R.) of from −20° C. to 80° C., or more preferably from −30° C. to 90° C. and above. As to the transition point $T_N$ at the low temperature side, however, the liquid crystal composition is not always necessary to have the $T_N$ point at −20° C., but if it can maintain its nematic state for an appropriate period of time under the overcooling condition, say, for example, a couple of months, there would be no practical problem in its application.

The liquid crystal to be used for the present invention is not at all limited to the substances as mentioned in the foregoing, but any kinds of substance that exhibit the positive dielectric anisotropy either in its single form or a mixture of two or more kinds may all be included in the liquid crystal composition of the present invention.

In the following, preferred examples of the present invention will be presented to enable those skilled persons in the art to put the invention into practice.

EXAMPLE 1

A mixed liquid crystal consisting of 40% of $A_2$ and 60% of $A_4$ (M.R.=51° to 157°) and a mixed liquid crystal consisting of 24% of $G_2$, 36% of $G_4$, 24% of $I_1$, and 16% of $I_2$ (M.R.=49° to 200° C.) were mixed together in substantially equal quantities, whereby a liquid crystal composition having a very broad M.R. of from 14° to 175° C. was obtained. Also, a substantially same result could be obtained, even when the mixing ratios of the mixed liquid crystals were varied to a certain degree. Further, similar results could be obtained, even when the mixing ratio of the compounds $A_2$, $A_4$, $G_2$, $G_4$, $I_1$ and $I_2$ were varied within a range not exceeding 5% for each. Furthermore, substantially same tendency was exhibited, even when the compounds $A_8$ and $A_{10}$, $C_1$ and $C_2$ or $B_2$ and $B_4$ were substituted for $A_2$ and $A_4$, and the compound $H_3$ for $G_2$.

EXAMPLE 2

A mixed liquid crystal consisting of 24% of $A_2$, 36% of $A_4$, and 40% of $A_{10}$ (M.R.=22° to 154° C.) and a mixed liquid crystal consisting of 45% of $M_4$, 30.3% of $N_2$, and 24.7% of $N_4$ (M.R.=5° to 57° C.) were mixed together at a ratio of 2:3 by weight, whereby a liquid crystal composition having a very broad M.R. of −15° to 97° C. was obtained. The composition exhibited durability against overcooling at −40° C. for one month. Similar results could be obtained, even when the mixing ratio of each liquid crystal component was varied within a range not exceeding 5% for each. Further, substantially same results were obtained even when the compounds $C_2$, $C_3$, and $C_6$ were used for $A_2$, $A_4$, and $A_{10}$, the compound $O_3$ or $O_4$ for $M_4$, and the compound $N_3$ for $N_2$. Furthermore, substantially same tendency was shown, even when $D_1$ and $D_3$ or $E_1$ and $E_4$ were used in place of $A_2$ and $A_4$, respectively.

EXAMPLE 3

When a mixed liquid crystal consisting of 30% of $A_2$, 45% of $A_3$, and 25% of $A_4$ (M.R.=34° to 156° C.) and a mixed liquid crystal consisting of 60% of $P_2$, and 40% of $P_{16}$ (M.R.=34° to 68° C.) were mixed together in substantially equal quantities, there was obtained a liquid crystal composition having M.R. of from 5° to 109° C. Substantially same results were obtained even when the mixing ratio of each liquid crystal component in the mixture was varied within a range not exceeding 5% for each. Further, substantially same tendency was exhibited, even when the compounds $B_3$, $B_4$, and $B_5$ were used in place of $A_2$, $A_3$ and $A_4$; $P_3$ or $P_4$ for $P_2$; and $Q_9$ for $P_{16}$.

EXAMPLE 4

A mixed liquid crystal consisting of 26% of $A_2$, 39% of $A_4$, 11% of $B_2$, and 24% of $B_4$ (M.R.=34° to 169° C.) and a mixed liquid crystal consisting of 42% of $r_1$, 28% of $S_1$, and 30% of $S_8$ (M.R.=20° to 129° C.) were mixed together at a ratio by weight of 1:2, whereupon a liquid crystal composition having the M.R. of from 0° to 142° C. was obtained. Substantially same tendency was exhibited, even when $r_2$, $r_6$ or $r_7$ was used in place of $r_1$, and $S_2$ and $S_7$ for $S_1$ and $S_8$, respectively.

EXAMPLE 5

A mixed liquid crystal consisting of 36% of $A_2$, 54% of $A_4$, and 10% of $D_7$ (M.R.=48° to 156° C.) and a mixed liquid crystal consisting of 33% of $T_3$, 33% of $T_{12}$, and 34% of $U_1$ (M.R.=10° to 64° C.) were mixed together at a weight ratio of 3:17, whereupon a liquid crystal composition having the M.R. of from −1° to 73° C. was obtained. Substantially same results were obtained, even when $E_3$ was used in place of $D_7$.

EXAMPLE 6

A mixed liquid crystal consisting of 40% of $A_2$ and 60% of $A_4$ was mixed together with a mixed liquid crystal consisting of 41% of $V_3$, 34% of $V_5$, and 25% of $W_4$ (M.R.=79° to 220° C.) at a weight ratio of 3:1, whereupon a liquid crystal composition having the M.R. of from 41° to 172° C. was obtained. A substantially same tendency was exhibited, even when $V_8$ and $V_{10}$ were used in place of $V_3$ and $V_5$.

EXAMPLE 7

In place of the mixed liquid crystal consisting of $V_3$, $V_5$ and $W_4$ in Example 6 above, there was used a mixed crystal consisting of 38.1% of $M_2$, 22.6% of $M_4$, 12.3% of $N_4$, 3.9% of $V_3$, 6.3% of $V_4$, 9% of $V_5$, and 7.6% $Z_2$ (M.R.=−9° to 82° C.), whereupon a liquid crystal composition having the M.R. of from 0° to 101° C. was obtained. A substantially same tendency was exhibited, even when the compounds $V_8$, $V_9$ and $V_{10}$ were used in place of $V_3$, $V_4$ and $V_5$, and the compound $Z_3$ or $Z_8$ for $Z_2$.

EXAMPLE 8

A mixed liquid crystal consisting of 40% of $A_2$ and 60% of $A_4$, a mixed liquid crystal consisting of 60% of $M_2$ and 40% of $M_4$, (M.R.=0° to 37° C.), and a mixed liquid crystal consisting of 42% of $G_2$, 30% of $G_4$, and 28% of $I_2$ (M.R.=55° to 195° C.) were mixed together at a weight ratio of 33:41.5:25.5, respectively, whereupon a liquid crystal composition having the M.R. of from −10° to 112° C. was obtained. This liquid crystal composition exhibited durability against the supercooled condition at −40° C. over one month. Substantially same results were obtained, even when the compounds $A_3$ and $A_5$ were used in place of $A_2$ and $A_4$; and $O_2$ and $O_3$ for $M_2$ and $M_4$.

EXAMPLE 9

A mixed liquid crystal consisting of 40% of $A_2$ and 60% of $A_4$ was mixed together with "E-8" (a trade name for a product of Merck & Co., U.S.A.) which is a mixed liquid crystal consisting of compounds represented by the general formulas (3) and (8) at a weight ratio of 3:7, whereupon a liquid crystal composition having the M.R. of from −8° to 96° C. was obtained. The composition exhibited durability against overcooling at −40° C. over one month.

EXAMPLE 10

In the above Example 9, "ZLI-319" (a trade name for a product of Merck & Co., U.S.A.) which is a mixed liquid crystal consisting of compounds represented by the general formulas (5) and (6) was used in place of "E-8", and a liquid crystal composition having the M.R. of from −10° to 86° C. was obtained.

EXAMPLE 11

In Example 8, the following various mixed liquid crystals were used in place of the mixed liquid crystal consisting of $M_2$ and $M_4$. The results obtained were substantially the same.

| Mixed Liquid Crystal (wt %) | M.R. (°C.) |
| --- | --- |
| $M_3:M_5$ = 60:40 | −3 to 32.5 |
| $M_2:M_4:M_5$ = 30:20:50 | −4 to 38.0 |
| $M_2:M_4:N_4$ = 45:30:25 | −0.5 to 47.1 |
| $M_2:N_2:N_4$ = 50:28:22 | 2 to 52.4 |
| $M_2:M_4:N_2:N_4$ = 30:20:28:22 | 2 to 53.6 |
| $M_2:M_3:M_4:M_5$ = 30:25:20:25 | −21 to 35 |

EXAMPLE 12

In Example 8 above, the following various mixed liquid crystals were used in place of the mixed liquid crystal consisting of $G_2$, $G_4$ and $I_2$. The results obtained were substantially the same.

| Mixed Liquid Crystal (wt %) | M.R. (°C.) |
| --- | --- |
| $G_2:I_1:I_2$ = 42:30:28 | 59 to 210 |
| $G_2:G_{12}:I_2$ = 37:30:33 | 60 to 198 |
| $I_1:I_2:G_2:G_{12}$ = 30:33:17:20 | 50 to 200 |
| $G_2:G_4:H_8:I_2$ = 24:30:30:16 | 47 to 191 |
| $G_4:G_{12}:H_3:I_4$ = 25:27.5:25:22.5 | 40 to 191 |
| $G_2:G_4:H_3:I_1:I_2$ = 19:29:20:19:13 | 40 to 196 |

In these various cases, the compounds $J_1$ and $J_2$, $J_3$ and $J_5$, or $K_1$ and $K_3$ were used in place of $I_1$ and $I_2$, respectively. A substantially same tendency was exhibited.

EXAMPLE 13

A liquid crystal composition prepared by adding 0.75% of cholesteric chloride to the liquid crystal composition obtained in Example 8 was sealed in between two sheets of indium oxide electrodes having an electrode gap of 6 microns to construct a liquid crystal cell.

The electrical properties of this liquid crystal cell at 25° C. were measured as follows:

| Vth | 1.6V | $\tau_r$: | 60ms(4 V rpm) |
|---|---|---|---|
| Vs | 3.5V | $\tau_d$: | 60ms(4 V rpm) |

(Vth, Vs, $\tau_r$ and $\tau_d$, respectively, designate a threshold voltage, a saturated voltage, a rising response time, and a decaying response time.)

EXAMPLE 14

In Example 13 above, the chiral nematic liquid crystal of 4''-(2-methylbutyl)-4-cyanobiphenyl was added in 0.5% in place of cholesteric chloride. A substantially same result was obtained.

EXAMPLE 15

The liquid crystal cells fabricated in Examples 13 and 14 were subjected to continuous electric conduction with AC 5 volts. The result showed that the initial state of the liquid crystal cell maintained unchanged even after lapse of a six-month period, whereby sufficient reliability could be confirmed as to its life.

From the foregoing preferred examples of the present invention, it will be understood that the liquid crystal compositions according to the present invention are particularly excellent. The liquid crystal composition according to the present invention is considered to be applicable to various fields, as is the case with the conventional liquid crystal substance, such as, for example, display elements, physical shutters, optical filters, light deflectors, and so forth. Of such various applications, the application to the display devices utilizing the electro-optical effect is highly expected, which can be used for electronic desk calculators, and other alpha-numeric display. Moreover, since the liquid crystal composition according to the present invention has an excellent adaptability to the dynamic drive (or matrix drive), it is suitable for display of multi-numerical places, hence it can be effectively used for the electronic desk calculator having four or more numerical places, or a wall television display device, or a panel display device, etc.

What we claim is:

1. A liquid crystal composition comprising a mixture of at least one kind of liquid crystal substance represented by the following general formula (1):

(1)

wherein $R_1$ and $R_2$ are selected from CN, $C_nH_{2n+1}$, $C_nH_{2n+1}O$, and $C_nH_{2n+1}COO$ groups where n is an integer of from 1 to 10, and wherein both $R_1$ and $R_2$ are not CN groups simultaneously;
and at least one kind of liquid crystal substance represented by the following general formulas (2) and (3):

(2)

wherein $R_3$ and $R_4$ are selected from CN, $C_nH_{2n+1}$, $C_nH_{2n+1}O$, and $C_nh_{2n+1}COO$ groups where n is an integer of from 1 to 10, and wherein both $R_3$ $R_4$ are not CN groups simultaneously;

(3)

wherein $r_5$ is selected from $C_nH_{2n+1}$, $C_nH_{2n+1}O$, and $C_nH_{2n+1}COO$ groups where n is an integer of from 1 to 10.

2. A liquid crystal conposition as claimed in claim 1, wherein $C_nH_{2n+1}$, $C_{n+1}O$ and $C_nH_{2n+1}COO$ groups in the general formulas (1), (2) and (3) are in the straight chain form.

3. A liquid crystal composition as claimed in claim 1, wherein $R_1$ and $R_2$ in the general formula (1) are selected from $C_nH_{2n+1}$, $C_nH_{2n+1}O$, and $C_nH_{2n+1}COO$ groups where n is an integer of from 1 to 8.

4. A liquid crystal composition as claimed in claim 1, wherein one of $R_1$ and $R_2$ in the general formula (1) is a CN group, while the other one is selected from $C_nH_{2n+1}$, $C_nH_{2n+1}O$, and $C_nH_{2n+1}COO$ groups.

5. A liquid crystal composition as claimed in claim 1, wherein at least one of $R_3$ and $R_4$, and $R_5$ in the general formulas (2) and (3) are selected from $C_nH_{2n+1}$, $C_nH_{2n+1}O$ and $C_nH_{2n+1}COO$ groups where n is an integer of from 2 to 8.

6. A liquid crystal composition as claimed in claim 1, wherein one of $R_3$ and $R_4$ in the general formula (2) is a CN group.

7. A liquid crystal composition as claimed in claim 1, wherein said mixture of liquid crystal substances consists of two or more kinds of compounds belonging to the same general formulas (1) to (3) and exhibits positive dielectric anisotropy.

8. A liquid crystal composition as claimed in claim 1, wherein each and every liquid crystal substance represented by the general formulas (1) to (3) has positive dielectric anisotropy.

9. A liquid crystal composition as claimed in claim 1, wherein the amount of the liquid crystal substance represented by the general formula (1) in said mixture ranges form 5 to 90% by weight.

10. A liquid crystal composition as claimed in claim 1, wherein the amount of the liquid crystal substance represented by the general formula (1) in said mixture ranges from 10 to 70% by weight.

11. A liquid crystal composition as claimed in claim 1, wherein the amount of the liquid crystal substance represented by the general formula (1) in said mixture ranges from 1- to 90% by weight, when it is mixed with the liquid crystal substance represented by the general formula (3).

12. A liquid crystal composition as claimed in claim 1, further comprising an amount not exceeding 10% by weight of the compound of the general formula:

13. A liquid crystal composition as claimed in claim 1, further comprising an amount not exceeding 10% by weight of the compound of the general formula:

14. A liquid crystal composition as claimed in claim 1, further comprising an amount not exceeding 10% by weight of the compound of the general formula:

15. A liquid crystal composition as claimed in claim 1, further comprising an amount not exceeding 5% by weight of a cholesteric liquid crystal.

16. A liquid crystal composition as claimed in claim 1, further comprising an amount not exceeding 5% by weight of a chiral nematic liquid crystal.

17. A liquid crystal composition consisting of a mixture of at least one kind of liquid crystal substance represented by the following general formula (1):

wherein $R_1$ and $R_2$ are selected from CN, $C_nH_{2n+1}$, $C_nH_{2n+1}O$, and $C_nH_{2n+1}COO$ groups where n is an integer of from 1 to 10, and wherein both $R_1$ and $R_2$ are not CN groups simultaneously;

and at least one kind of liquid crystal substance represented by the following general formula (2):

wherein $R_3$ and $R_4$ are selected from CN, $C_nH_{2n+1}$, $C_nH_{2n+1}O$, and $C_nH_{2n+1}COO$ groups where n is an integer of from 1 to 10, and wherein both $R_3$ and $R_4$ are not CN groups simultaneously.

18. A liquid crystal composition as claimed in claim 17, wherein the amount of the liquid crystal substance represented by the general formula (1) in said mixture ranges from 1 to 99%.

19. A liquid crystal composition as claimed in claim 17, wherein the amount of the liquid crystal substance represented by the general formula (1) in said mixture ranges from 5 to 90% by weight.

20. A liquid crystal composition as claimed in claim 17, wherein the amount of the liquid crystal substance represented by the general formula (1) in said mixture ranges from 10 to 70% by weight.

21. A liquid crystal composition consisting of a mixture of at least one kind of liquid crystal substance represented by the following general formula (1):

wherein $R_1$ and $R_2$ are selected from CN, $C_nH_{2n+1}$, $C_nH_{2n+1}O$, and $C_nH_{2n+1}COO$ groups where n is an integer of from 1 to 10, and wherein both $R_1$ and $R_2$ are not CN groups simultaneously;

and at least one kind of liquid crystal substance represented by the following general formula (2):

wherein $R_5$ is selected from $C_nH_{2n+1}$, $C_nH_{2n+1}O$, and $C_nH_{2n+1}COO$ groups where n is an integer of from 1 to 10.

22. A liquid crystal composition as claimed in claim 21, wherein the amount of the liquid crystal substance represented by the general formula (1) in said mixture ranges from 1 to 90%.

23. A liquid crystal composition as claimed in claim 21, wherein the amount of the liquid crystal substance represented by the general formula (1) in said mixture ranges from 5 to 70%.

24. A liquid crystal composition as claimed in claim 21, wherein the amount of the liquid crystal substance represented by the general formula (1) in said mixture ranges from 10 to 50%.

25. A liquid crystal composition as claimed in claim 1, further comprising at least one liquid crystal compound selected from compounds of formulas (6) and (8):

wherein $R_3$ and $R_4$ in formula (6) are selected from CN, $C_nH_{2n+1}$, $C_nH_{2n+1}O$, $C_nH_{2n+1}COO$ and $C_nH_{2n+1}OCOO$ groups; wherein said $R_3$ and $R_4$ are not CN groups simultaneously; and wherein $R_5$ has the same meansing as in claim 1.

* * * * *

UNITED STATES PATENT AND TRADEMARK OFFICE
CERTIFICATE OF CORRECTION

PATENT NO. : 4,222,887
DATED : August 16, 1980
INVENTOR(S) : YOHJI MATSUFUJI

It is certified that error appears in the above-identified patent and that said Letters Patent are hereby corrected as shown below:

Col. 2, line 3, change "suc" to --such--;
Col. 3, line 16, change --$V_a \leq V$ "$V_b$-- to --$V_a \leq V \leq V_b$--;
Col. 3, line 17, change "$(V_b-V_a)$" to --$(V_b-V_a)$--;
Col. 3, line 24, change "costs" to --cost--;
Col. 3, line 42, change "above-mentined" to --above-mentioned--;
Col. 4, line 12, after "from" insert --$(C_nH_{2n+1})$,--;
Col. 4, line 14, change "1to" to --1 to--;
Col. 4, line 54, insert --may-- after "compound";
Col. 7, line 18, change "at" to --et--;
Col. 12, line 61, change "liquiid" to --liquid--;
Col. 14, line 17, change "-20°C" to "-20°C or -30°C";
In Claim 1, in the second line after formula (2), change "$C_nh_{2n+1}COO$" to --$C_nH_{2n+1}COO$--; in the third line after formula (2), insert --and-- between "$R_3$" and "$R_4$"; in the first line after formula (3), change "$r_5$" to "$R_5$"--;

In Claim 9, line 4, change "form" to --from--;
In Claim 25, last line, change "meansing" to --meaning--.

Signed and Sealed this

Thirteenth Day of January 1981

[SEAL]

Attest:

SIDNEY A. DIAMOND

Attesting Officer     Commissioner of Patents and Trademarks